Figure 5:
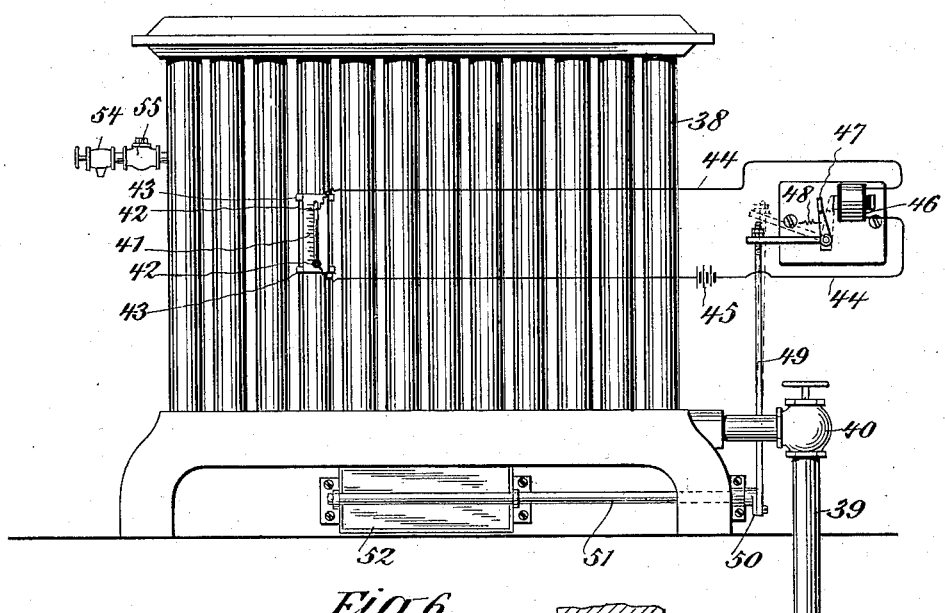

No. 647,024. Patented Apr. 10, 1900.
A. G. PAUL.
HEATING SYSTEM.
(Application filed June 4, 1897.)
(No Model.) 3 Sheets—Sheet 1.
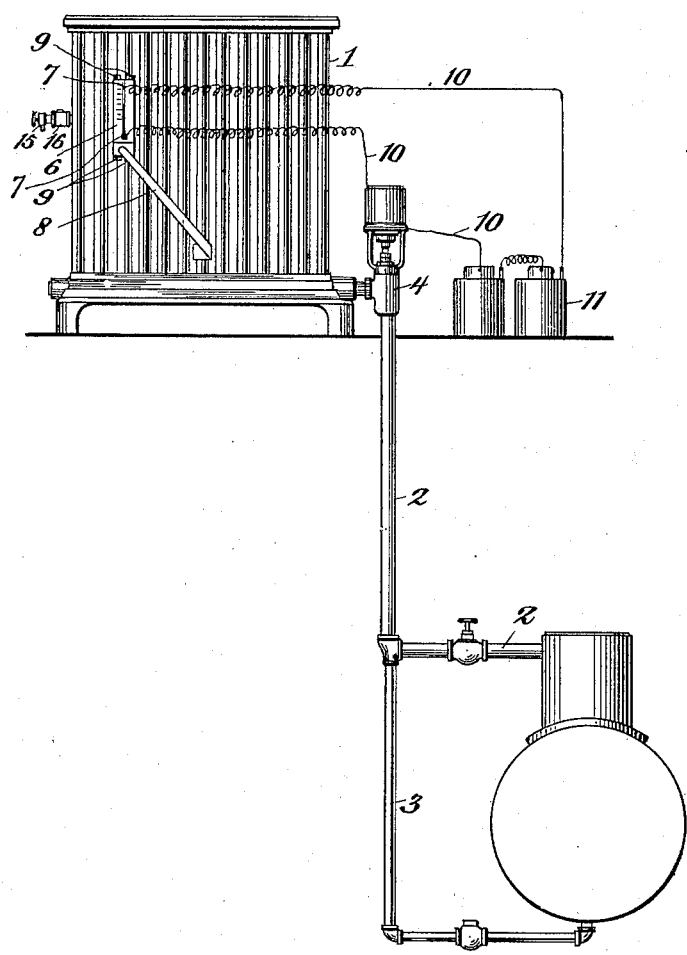
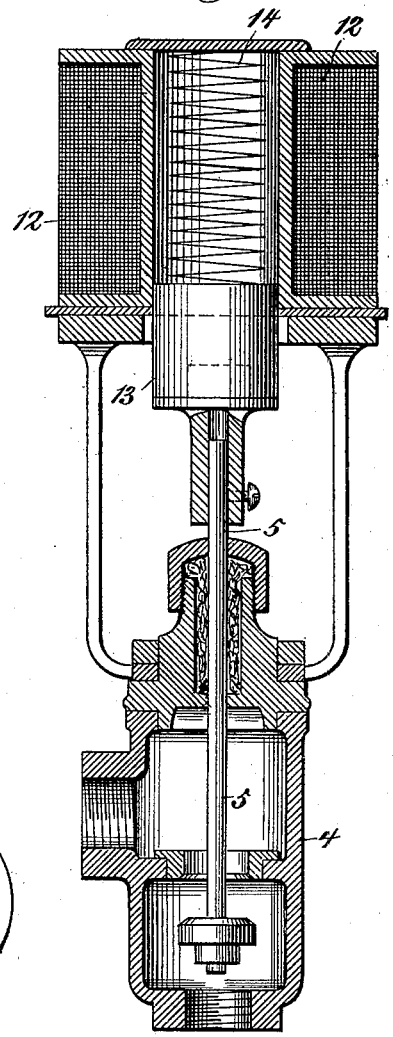
WITNESSES:
Jas C Howell
Geo W Mills Jr
INVENTOR
Andrew G. Paul,
BY
Witter & Kenyon
ATTORNEYS.

No. 647,024. Patented Apr. 10, 1900.
A. G. PAUL.
HEATING SYSTEM.
(Application filed June 4, 1897.)
(No Model.) 3 Sheets—Sheet 2.
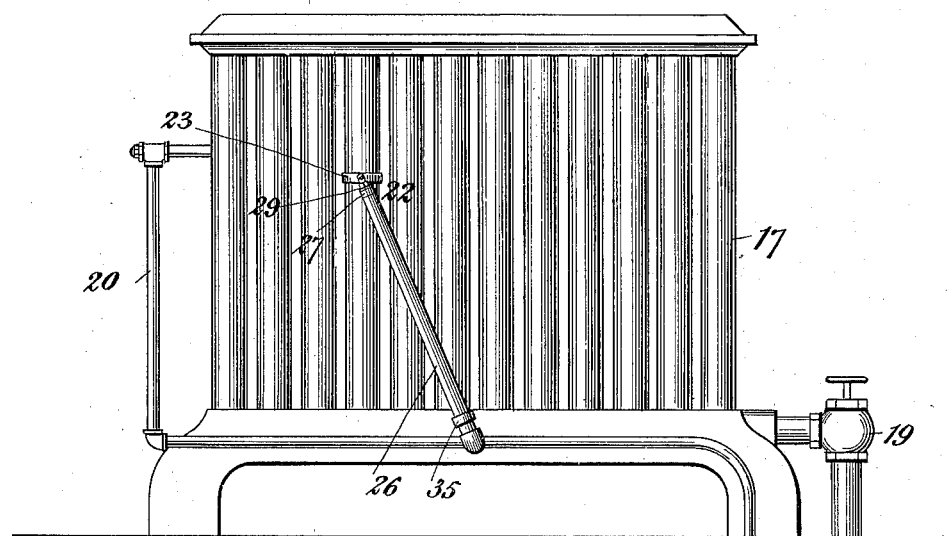
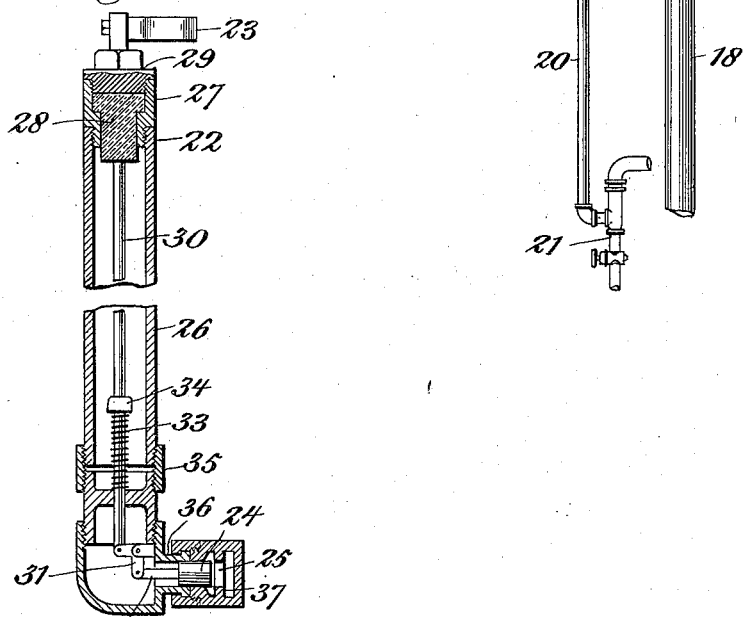
WITNESSES:
INVENTOR
Andrew G. Paul,
BY
Witter Kenyon
ATTORNEYS.

No. 647,024.  
A. G. PAUL.  
HEATING SYSTEM.  
(Application filed June 4, 1897.)  
Patented Apr. 10, 1900.

(No Model.)  
3 Sheets—Sheet 3.

WITNESSES:  
Jas. C. Howell  
Geo. W. Willoff

INVENTOR  
Andrew G. Paul,  
BY  
Witter & Kenyon,  
ATTORNEYS.

UNITED STATES PATENT OFFICE.

ANDREW G. PAUL, OF BOSTON, MASSACHUSETTS.

HEATING SYSTEM.

SPECIFICATION forming part of Letters Patent No. 647,024, dated April 10, 1900.

Application filed June 4, 1897. Serial No. 639,426. (No model.)

*To all whom it may concern:*

Be it known that I, ANDREW G. PAUL, a citizen of the United States, and a resident of Boston, in the county of Suffolk and State of Massachusetts, have invented a new and useful Improvement in Heating Systems, of which the following is a full, clear, and exact specification, reference being had to the accompanying drawings, which form a part hereof.

This invention relates to heating systems in which a suitable heating agent or vehicle, as steam, is circulated through a system of pipes or passages leading to a suitable heater or radiator in the room or space to be heated. It applies equally well to single-pipe and double-pipe systems. Its object is to automatically and accurately control the amount of heat imparted by the system or the work done thereby, and in this way to regulate the temperature of the room or space that is being heated.

The invention consists, broadly, in the combination, with a circulatory heating system, of a thermostat adapted to be placed against or in close proximity to or in any suitable operative connection with some intermediate part of the system, so as to be expanded by the heat from said intermediate part, and a passage—such, for example, as the supply-pipe or the return-pipe or the air-pipe or an air-flue—adapted to be controlled by the operation of the thermostat and thereby to control the operation of the system, and means for cutting said thermostat out of operation. In the best form of the invention the thermostat is adapted to be moved away from the said intermediate part of the system and in this way to be cut out of operation when desired.

The invention consists also in the combination, with a heater or radiator or any form of heating system and means for controlling the same, such as a valve on the supply-pipe or on the air-pipe or a valve in an air-flue combined with the heater or radiator or any valve or other means controlling the heat imparted by the system or the work done thereby, of a thermostat adapted to be placed against or in close proximity to some intermediate part of the heater or radiator or heating system and to be expanded by the heat from said intermediate part, and to thereby operate the said controlling means and to be moved away from said position when desired or otherwise cut out of operation, whereby the effective heating power of the system can be reduced or increased as desired or the extent of the heater or radiator or system called into action can be varied and regulated and the temperature thereby controlled.

The invention also consists in the combination, in a heating system in which a heating-vehicle is caused to circulate through one or more radiators, of a radiator, means for controlling the admission of the heating-vehicle to the same, and a thermostat adapted to be placed against or in close proximity to some intermediate part of the radiator, so as to be expanded by the heat from said intermediate part, and means for cutting said thermostat out of operation when desired, and connections between the thermostat and the controlling means, whereby when the thermostat is applied to said intermediate part of the radiator and that part becomes sufficiently heated the controlling means is actuated so as to check or prevent the admission of the heating-vehicle to the radiator and when the thermostat cools sufficiently the controlling means is actuated so as to admit more of the heating-vehicle to the radiator and when the thermostat is cut out of operation the admission of the heating-vehicle to the radiator is not controlled by the heat from said intermediate part of the radiator.

The invention also consists in the combination, with a heater or radiator, of means for governing the effective heating power of the radiator and a thermostat to actuate the governing means and adapted to be adjusted along the surface of the heater or radiator.

The invention consists also in the combination, with a heater or radiator or any form of heating system and means for controlling the same, such as is referred to in the preceding paragraphs, of a thermostat adapted to be placed against or in proximity to different parts of the heater or radiator or heating system and to be expanded by the heat from the same and to thereby operate the said controlling means, whereby the extent of the heater or radiator or system called into action can be varied and regulated to a still greater extent and the temperature thereby accurately and nicely controlled.

The invention also consists in the combination, with a heater or radiator or any form of heating system having a supply-pipe and a valve on the supply-pipe, of an adjustable thermostat adapted to be placed against or in proximity to different parts of the heater or radiator or heating system and to be expanded by the heat from the same and to thereby operate the valve on the supply-pipe.

The invention also consists in certain other features of construction and combinations of parts hereinafter described and claimed.

The invention is clearly illustrated in the accompanying drawings, in which—

Figure 6:
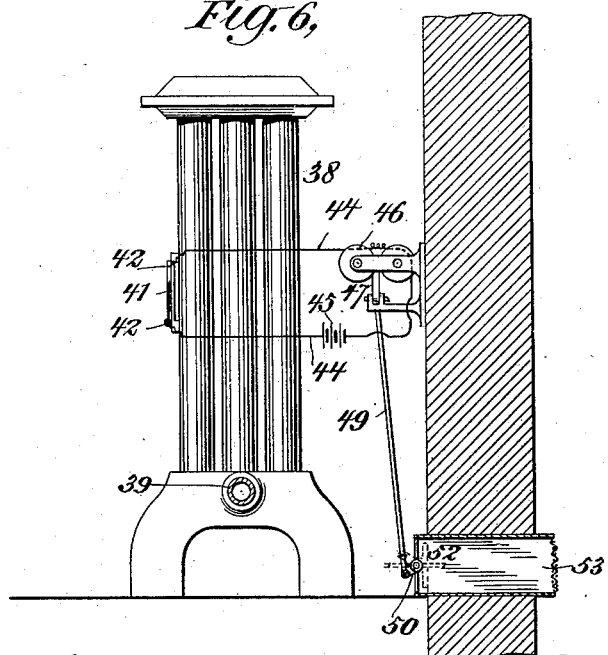

Figure 1 shows a radiator with an adjustable thermostat applied thereto and adapted to operate a solenoid-valve on the supply-pipe. Fig. 2 is a sectional view of this valve. Fig. 3 shows a radiator with an adjustable thermostat applied thereto and adapted to operate a valve in the air-pipe. Fig. 4 is a detailed sectional view of the thermostat, showing its connection with the air-pipe. Fig. 5 shows a radiator with an adjustable thermostat applied thereto and adapted to operate a valve in an air-flue, and Fig. 6 is an end view of the device shown in Fig. 5 looking from right to left.

Referring to Figs. 1 and 2, 1 is an ordinary radiator. 2 is the supply-pipe, a part of which also serves as the return-pipe. 3 is the return-pipe connecting the boiler with the supply-pipe, as shown. It is provided with a check-valve. 4 is the valve on the supply-pipe. 5 is the valve-stem. 6 is a thermostat in the form of a thermometer-tube containing mercury or other suitable conducting and expansible substance and provided with two contact-points 7 7. The tube is supported by the arm 8, which is pivoted to the radiator at its lower end and to the thermometer at its upper end in any suitable way. The thermometer is provided with one or more clips 9, adapted to slip upon the radiator-tubes, so as to fasten the thermometer in place. These clips can be greatly varied in form. In Fig. 4 a suitable form is more fully illustrated. By this means the thermometer can be swung or moved so as to be fastened against or in close proximity to or in operative connection with any tube of the radiator, so as to be expanded by the heat therefrom. I prefer to use a supporting-arm, such as arm 8, although it is not necessary to do so, as the thermostat could be held in place simply by clips or by other suitable fastening devices—for example, in the manner illustrated in Fig. 5. 10 is an electric circuit connected with the thermostat. 11 is a battery. 12 is a coil of properly-insulated wire. 13 is the armature which is attached to the valve-stem 5. 14 is a spring bearing against the bridge or cross-piece at the top and against the armature 13 at the bottom. 15 is an ordinary thermostatic air-valve, and 16 is a check-valve on the air pipe or outlet.

The operation of this apparatus is as follows: If eleven tubes of the radiator are all that are needed to do the work of heating, the thermostat is fastened to the eleventh tube in the manner shown in Fig. 1. The steam is turned on and the supply-valve at the radiator being open steam enters the radiator and gradually forces out the air through the air-valve 15. When the steam reaches the eleventh tube, it heats that tube and thereby heats the thermostat and expands the mercury or other expanding substance and closes the circuit. When the circuit is closed and the current established, the armature 13 is drawn up within the coil 12 and the supply-valve is closed. The steam is thus cut off. No more steam can enter the radiator until the steam in the eleventh tube has partly or wholly condensed and that tube has been cooled, so as to cause the expanding member of the thermostat to contract and break the circuit and thereby open the supply-valve. When the circuit is broken in this way, the spring 14 forces the armature 13 down and opens the supply-valve. Steam again enters the radiator until it reaches and heats the eleventh tube, when the supply-valve is again shut off in the manner already explained. The check-valve 16 prevents the entrance of air into the radiator through the air-outlet.

It will be seen that the supply pipe or passage is adapted to be controlled by the operation of the thermostat and thereby to control the operation of the system.

Another modification of my invention is shown in Figs. 3 and 4, in which 17 is an ordinary radiator. 18 is a pipe serving at the same time as the supply-pipe and the return-pipe, the radiator being connected up on the single-pipe system. 19 is an ordinary valve on the supply-pipe. 20 is an air-pipe connected with the upper part of the heater, and 21 is an exhauster at the outer end of the air-pipe. I prefer to use a jet of steam or water as the exhausting device. 22 is a thermostat provided with a catch or clip 23 at its upper end, adapted to be slipped upon any one of the tubes of the radiator, whereby the upper end of the thermostat can be fastened in position against or in proximity to any tube of the radiator. 24 is a valve in the air-pipe controlling the same and adapted to be operated by the thermostatic device, 25 being an opening in the air-pipe adapted to be closed by the plunger or valve 24. The construction of the thermostat can be greatly varied. In the particular form shown, 26 is a tube. 27 is a socket screwed into the upper end of this tube and adapted to receive and hold in place the expanding member 28. This expanding member can be made of any suitable expansible substance, such as a composition of vulcanized rubber and refractory material. The upper end of the member 28 is enlarged, and this enlargement bears against a shoulder in the socket 27. A screw-cap 29 bears against the upper end of the member 28. By these means the expanding member is held in place.

30 is a rod fastened to the lower end of the member 28. The rod is connected by a bell-crank lever 31 with the valve-stem 32 of the valve 24. 33 is a spring adapted to lift the rod 30, so as to open or assist in opening the valve 24 when the member 28 contracts. This spring bears against a projection 34 on the rod 30 and against a projecting collar or bridge on the inside of the tube 26. 35 is a union on the tube 26, by which that tube can be lengthened or shortened and the throw of the valve thereby regulated. The tube 26 is connected with the air-pipe 20 by the swivel-joint 36, which may be made in any suitable way and which enables the tube 26 to be turned or swung in either direction upon the air-pipe, whereby the upper end of the tube containing the expanding member can be brought opposite any tube of the radiator and fastened in such position by the clip 23. This clip is also connected to the upper end of the tube by a swivel-joint, so that it can turn and assume, for example, such position as is shown in Fig. 3 and be readily slipped onto any of the tubes, no matter at what angle the tube 26 may be inclined. If desired, the upper end of the tube 26 can be swung entirely away from the radiator-tubes, so that the expanding member will not be in contact with any one of them and the thermostat will be cut out of operation. The air-pipe 20 is divided at the valve 24 into two passages by the diaphragm 37, and in this diaphragm there is a discharge opening or port 25, adapted to be closed by the valve 24. The passage on one side of the diaphragm leads from the radiator to the valve. The passage on the other side leads from the valve to the exhauster. It will be understood that the construction of this valve in the air-pipe can be greatly varied. The operation of this form of my invention is as follows: When the system is started and the steam or other heating agent is admitted to the radiator, the air with which the radiator is filled passes out through the air-pipe. When an exhauster is used, the decreased pressure produced thereby in the air-pipe causes the air to flow into the air-pipe. When no exhauster is used, the discharge of the air is dependent on the pressure on the supply side. The amount of steam that can enter the radiator is dependent upon the amount of air that escapes therefrom. If the operator wishes to put into operation only nine tubes of the radiator, he turns the tube 26 so as to bring its upper end opposite the ninth tube and secures it in that position by means of the clip. When the steam reaches the ninth tube, that tube is heated, and this heat is imparted to the expanding member of the thermostat, which expands and closes the valve in the air-pipe. No more air can escape. Hence no steam can enter the radiator beyond the ninth tube. In this way the heat given off from the radiator operates the thermostat and through it closes the air-pipe. The thermostat is adapted to be placed directly against any one of the tubes. Hence the number of tubes brought into operation can be controlled and regulated as desired. It will be readily understood that the thermostat might be so arranged as to be placed near to the tube instead of against or in actual contact with it. By putting the expanding member in the upper part of the tube, and thereby bringing it as near as possible to the source of heat, its efficiency is increased. In this form of the invention the air pipe or passage is controlled by the operation of the thermostat, and thus the operation of the system is controlled.

Another modification of my invention is shown in Figs. 5 and 6, in which 38 is a radiator; 39, a supply-pipe; 40, a supply-valve; 41, a thermostat consisting of a thermometer-tube, such as above described, having two contact-points 42 42; 43 43, clips to hold the thermostat in place; 44, an electric circuit, including a battery 45 and an electromagnet 46, an armature 47, and a spring 48. The armature is connected in any suitable way with the rod 49, which in turn is connected by means of the crank 50 with the damper-rod 51. 52 is the damper controlling the air-flue 53. 54 is a thermostatic air-valve, and 55 is a check-valve on the air-outlet. The operation of this form of my invention is as follows: If the operator wishes to call into full action only nine tubes in the radiator, he fastens the thermostat to the ninth tube. The system being started, steam enters the radiator through the supply-pipe and forces the air out of the same through the air-outlet. As soon as the steam reaches and heats the ninth tube the thermostat is heated and expanded, the circuit is closed, and through and by means of the armature and its connections the damper-rod is turned and the damper is opened. A current of cold air enters through the air-flue 53 and strikes against the radiator and reduces the effective heating power of the system and decreases the temperature of the room or of the air passing away from the heater. When the temperature of the ninth tube has fallen sufficiently, the expanding member of the thermostat contracts, as a result of which the circuit is broken and the damper in the air-flue is closed and the current of cold air shut off. The temperature of the ninth tube of the radiator is again increased until by the expansion of the member of the thermostat the circuit is closed and the air-flue is again opened, as before. In this case the air flue or passage is controlled by the operation of the thermostat, and thereby the operation of the system is controlled.

It will be apparent that the thermostat can be moved or swung entirely away from the tubes of the radiator and thus cut out of operation. It will also be apparent that the thermostat could be so arranged as to be capable of being placed against some one part of the radiator—for example, the middle part—so as to bring only half of the radiator into operation, and of being moved entirely away from the radiator when the whole radiator is to be used.

One advantage of my invention is that the work of the heater or radiator is automatically controlled and regulated by means of the heat given off therefrom. The thermostat being adjustable in the manner described can be placed against any selected part or tube of the radiator. When the heating agent reaches that part or tube of the radiator and heats it sufficiently, the member in the thermostat is expanded, and thereby made to operate the means or device which controls the admission of the heating agent to the radiator or which in some other way controls the effective heat supplied or the work done by the radiator. The invention secures great economy in the operation of the system and enables the operator or user to accurately regulate and to vary within wide limits the amount and degree of heat produced and maintained thereby. The work of the system is perfectly and easily controlled by the user. When the thermostat has been placed in the selected position, its operation is entirely automatic. Even temperatures and temperatures of any desired degree can be produced and maintained without any difficulty.

Although my invention in its broadest form includes the combination of a thermostat adjustable in the manner described with any means for regulating and controlling the action of the system, yet in the best form thereof I combine the adjustable thermostat with means for controlling directly or indirectly the admission of the heating agent to the radiator or system. By combining a check-valve on the air-outlet with the other elements described, including an adjustable thermostat connected with a valve on the supply-pipe, I secure a special advantage. The check-valve prevents the entrance of air into the radiator through the air-outlet. When in the operation of the system the steam has reached the tube of the radiator to which the thermostat has been applied, the thermostat is heated and its member expanded and the supply-pipe thereby closed. A part of the radiator is full of steam and a part is full of air. The steam gradually condenses, thereby decreasing the pressure in the radiator. As the check-valve prevents any air from entering from the outside, it follows that as the pressure decreases both the steam and the air expand. The temperature of the particular tube to which the thermostat is applied is decreased in two ways—first, by the decrease in the temperature of the steam as its pressure falls, and, secondly, by the fact that as the air expands it gradually forces the steam back from this particular tube. This decrease in the temperature is, however, gradual, and the steam in the radiator is made to continue its work of heating for a considerable period of time. On the contrary, if there is no check-valve on the air-outlet as soon as the steam has condensed sufficiently to reduce the pressure in the radiator to a point below atmosphere cold air rushes in from the outside and cools the tubes of the radiator quickly and forces the remaining steam back toward the supply end more quickly and drives it back from the particular tube to which the thermostat is applied more quickly than would otherwise be the case. I do not herein claim specifically the combination of such an adjustable thermostat with an air-pipe and means for controlling the same, as I have reserved the claims for this species of my invention for a separate application, Serial No. 643,528, filed July 6, 1897. I do not herein claim specifically the combination of such an adjustable thermostat with means for controlling the radiator and system and a flexible electric circuit for connecting the thermostat with such means, as I have reserved the claims for this species of my invention for a separate application, Serial No. 643,529, filed July 6, 1897.

Having fully described my invention, what I claim as new, and desire to secure by Letters Patent, is—

1. The combination with a circulatory heating system of a thermostat adapted to be placed in operative connection with some intermediate part of the system, so as to be expanded by the heat from said intermediate part, and a passage adapted to be controlled by the operation of the thermostat and thereby to control the operation of the system and means for cutting said thermostat out of operation, substantially as shown and described.

2. The combination with a circulatory heating system, of a thermostat adapted to be placed in close proximity to some intermediate part of the system so as to be expanded by the heat from said intermediate part, and adapted to be moved away from said position when desired, and a passage adapted to be controlled by the operation of the thermostat and thereby to control the operation of the system, whereby, when the thermostat is applied to said intermediate part of the system and that part becomes heated to a certain temperature, the passage is controlled so as to reduce the effective heating power of the system, and when the temperature of said intermediate part falls below said point, the passage is controlled so as to increase the effective heating power of the system and when the thermostat is removed from said intermediate part the heat from said intermediate part no longer controls the passage, substantially as described.

3. The combination with a circulatory heating system of means for controlling the operation of the system and a thermostat adapted to be placed in close proximity to some intermediate part of the system, so as to be expanded by the heat from said intermediate part, connections between the thermostat and the controlling means, and means for cutting said thermostat out of operation, substantially as set forth.

4. The combination with a heating system, in which a heating-vehicle is caused to circulate through one or more heaters or radiators, of means for controlling the operation of the system and a thermostat adapted to be placed in close proximity to some intermediate part of the system, so as to be expanded by the heat from said intermediate part, and adapted to be moved away from said position, when desired, and connections between the thermostat and the controlling means, whereby when the thermostat is applied to said intermediate part of the system, and that part becomes heated to a certain temperature, the controlling means is actuated so as to reduce the effective heating power of the system, and when the temperature of said intermediate part falls below said point, the controlling means is actuated so as to increase the effective heating power of the system, and when the thermostat is removed from said intermediate part, the heat from said intermediate part no longer actuates the controlling means, substantially as set forth.

5. In a heating system, in which a heating-vehicle is caused to circulate through one or more radiators, the combination of a radiator, means for controlling the operation of the same and a thermostat adapted to be placed in close proximity to some intermediate part of the radiator so as to be expanded by the heat from said intermediate part and adapted to be moved away from said position when desired, and connections between the thermostat and the controlling means, whereby, when the thermostat is applied to said intermediate part of the radiator, and that part becomes sufficiently heated, the controlling means is actuated in one direction, and when said intermediate part falls in temperature, the said controlling means is actuated in the reverse direction, and when the thermostat is removed from said intermediate part, the heat from said intermediate part no longer actuates the controlling means, substantially as set forth.

6. In a heating system, in which a heating-vehicle is caused to circulate through one or more radiators, the combination of a radiator, means for controlling the admission of the heating-vehicle to the same and a thermostat adapted to be placed in close proximity to some intermediate part of the radiator so as to be expanded by the heat from said intermediate part and means for cutting said thermostat out of operation, when desired, and connections between the thermostat and the controlling means, whereby, when the thermostat is applied to said intermediate part of the radiator and that part becomes sufficiently heated, the controlling means is actuated so as to prevent the admission of any more of the heating-vehicle to the radiator and when the thermostat cools sufficiently the controlling means is actuated so as to admit the heating-vehicle to the radiator, and when the thermostat is cut out of operation, the controlling means is no longer actuated by the heat given off from said intermediate part of the radiator, substantially as set forth.

7. The combination of a heater or radiator, means for governing the effective heating power of the radiator or heater, and a thermostat to actuate the governing means and adapted to be adjusted along the surface of the heater or radiator.

8. The combination of a heater or radiator, means for controlling the effective heating power of the heater or radiator, a thermostat adapted to be placed against different parts of the heater or radiator, and to be expanded by the heat from the same, and to thereby operate the controlling means, substantially as set forth.

9. The combination of a heater or radiator, a valve for controlling the admission of the heating-vehicle thereto, a thermostat adapted to be placed against different parts of the heater or radiator and to be expanded by the heat from the same and to thereby operate the said valve, substantially as set forth.

10. The combination of a heater or radiator, a valve for controlling the admission of the heating-vehicle thereto, a thermostat made adjustable along the heater or radiator, and adapted to be expanded by the heat from the same and to thereby operate the controlling-valve, and a catch to hold the thermostat in whatever place it may be put, substantially as set forth.

11. The combination of a heater or radiator, a supply-pipe, a valve on the supply-pipe, a thermostat adapted to be placed in proximity to different parts of the heater or radiator and to be expanded by the heat from the same, connections between the thermostat and the valve, whereby the valve is operated by the heating and cooling of the thermostat, substantially as set forth.

12. The combination with a circulatory heating system of a thermostat adapted to be placed in close proximity to some intermediate part of the system so as to be actuated by the heat from said intermediate part, a passage through which a fluid heat-conveyer flows, adapted to be controlled by the operation of the thermostat, and means for cutting the thermostat out of operation, substantially as shown and described.

13. The combination with a circulatory heating system of a thermostat adapted to be placed in close proximity to some intermediate part of the system so as to be actuated by the heat from said intermediate part, and adapted to be moved away from said position when desired, and a passage through which a fluid heat-conveyer flows adapted to be controlled by the operation of the thermostat, substantially as shown and described.

14. The combination with a circulatory heating system of means for controlling the admission of the heating-vehicle to the same and a thermostat adapted to be placed in close proximity to some intermediate part of the system so as to be actuated by the heat from said intermediate parts and means for cutting said thermostat out of operation when desired and connections between the thermostat and the controlling means, substantially as shown and described.

In testimony whereof I have signed my name to this specification in the presence of two subscribing witnesses.

ANDREW G. PAUL.

Witnesses:
HERBERT A. RHOADES,
THOS. W. ANDREW.